United States Patent [19]

Levavi

[11] Patent Number: 4,760,901

[45] Date of Patent: Aug. 2, 1988

[54] HYDRAULIC BRAKING SYSTEM PARTICULARLY USEFUL IN HUMAN POWERED VEHICLES

[76] Inventor: Shmuel Levavi, Keren Kayemet L'Yisrael Street 18, Givatayim, Israel

[21] Appl. No.: 17,097

[22] Filed: Feb. 20, 1987

[51] Int. Cl.$^4$ .............................................. F16D 57/06
[52] U.S. Cl. ...................................... 188/291; 188/16
[58] Field of Search ................ 188/16, 20, 24.11, 291, 188/293, 294, 296, 344

[56] References Cited

U.S. PATENT DOCUMENTS

| | | | |
|---|---|---|---|
| 575936 | 1/1897 | Roso | 188/24.11 |
| 2,083,951 | 6/1937 | Guthoff et al. | 188/291 |
| 2,087,638 | 7/1937 | Clark | 188/291 |
| 2,179,540 | 11/1939 | Burdick | 188/291 X |
| 2,271,273 | 1/1942 | Mueller | 188/344 |
| 2,681,713 | 6/1954 | Chambers | 188/291 |
| 3,155,197 | 11/1964 | Lee et al. | 188/291 X |
| 3,505,908 | 4/1970 | Herrmann | 188/291 X |
| 4,456,310 | 6/1984 | Hayashi et al. | 188/344 X |
| 4,653,613 | 3/1987 | Blancas | 188/24.11 |

FOREIGN PATENT DOCUMENTS

| | | | |
|---|---|---|---|
| 3441916 | 5/1986 | Fed. Rep. of Germany | 188/344 |
| 0140633 | 11/1980 | Japan | 188/344 |

Primary Examiner—Duane A. Reger
Attorney, Agent, or Firm—Benjamin J. Barish

[57] ABSTRACT

A hydraulic braking system for braking a driven device, particularly a human powered vehicle, comprises a hydraulic pump, a clutch coupling the hydraulic pump to the driven device when the clutch is actuated, a hydraulic circuit for a liquid including a flow restrictor restricting the flow of the liquid therethrough, and a hydraulic connection from the pump to the hydraulic circuit. This arrangement is such that, when the clutch is actuated to couple the pump to the driven device, the flow restrictor imposes a hydraulic load on the driven device thereby braking it. The clutch is a jaw clutch including friction surfaces normally spaced apart but brought together, upon the actuation of the clutch actuator, before the jaws are brought into engagement with each other, to start the driven jaw to rotate before it moves into engagement with the driving jaw.

15 Claims, 2 Drawing Sheets

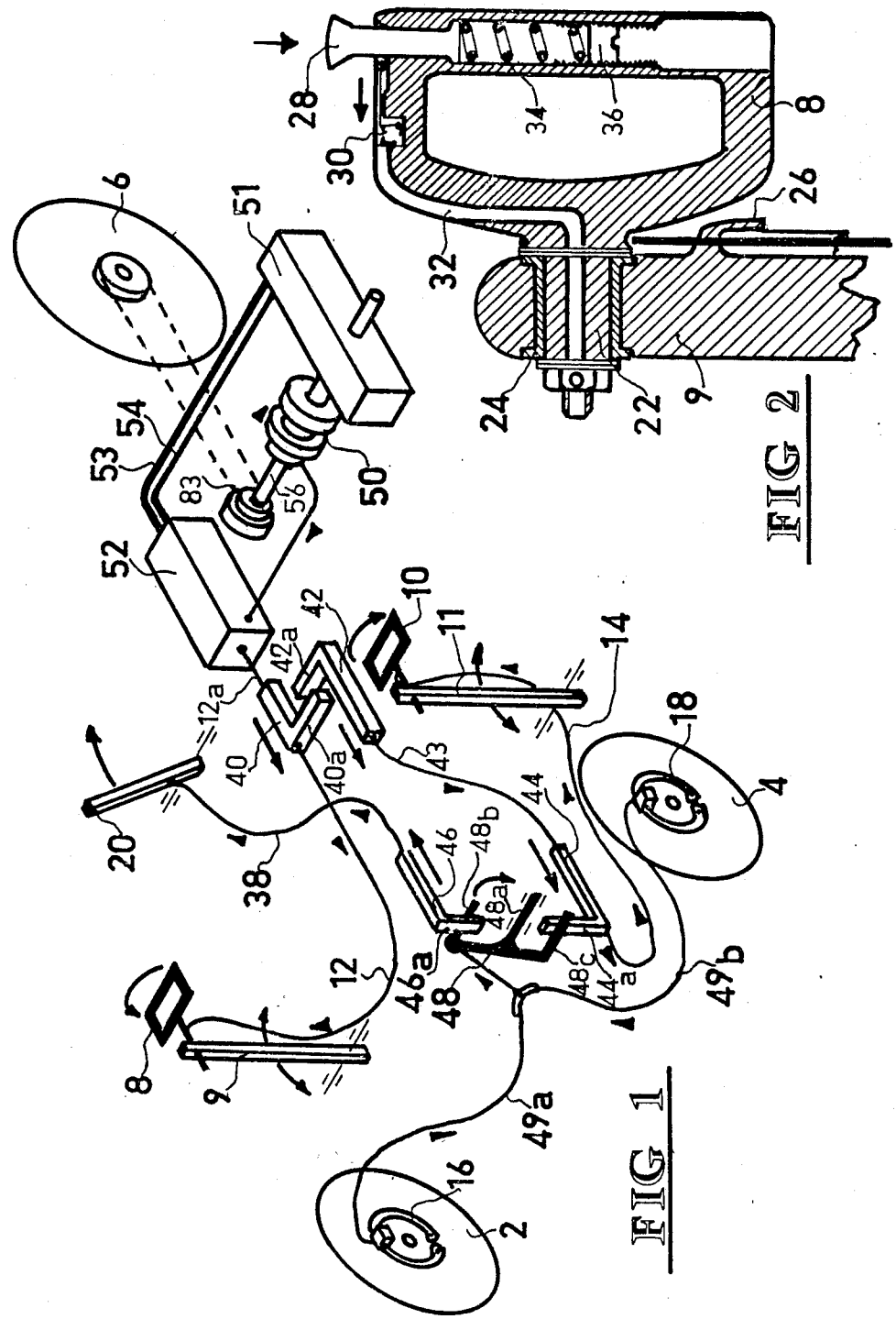

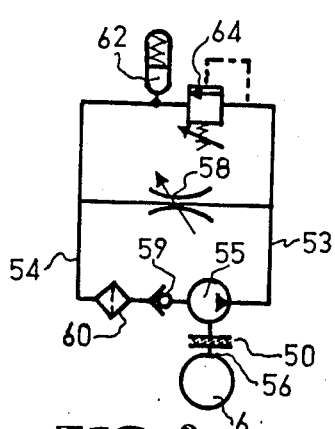
FIG 3
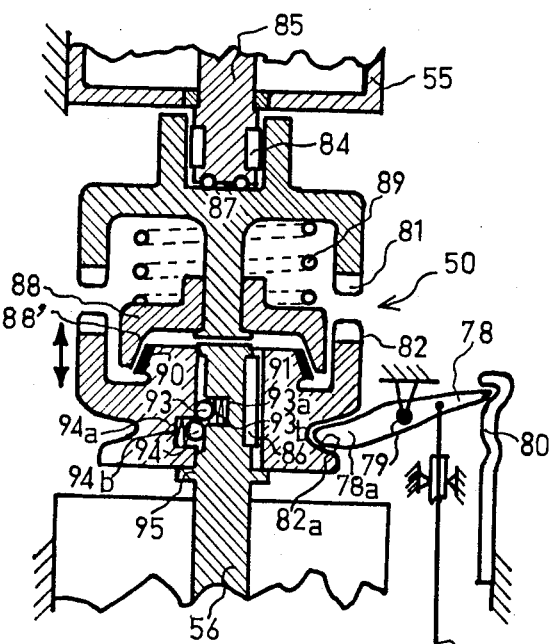
FIG 4
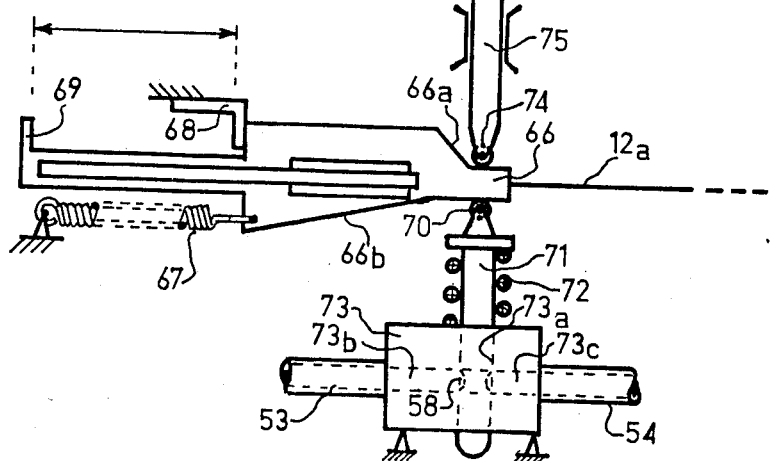

HYDRAULIC BRAKING SYSTEM PARTICULARLY USEFUL IN HUMAN POWERED VEHICLES

RELATED APPLICATIONS

The present application is related to my pending applications Ser. No. 06/809,387 filed Dec. 16, 1985, now U.S. Pat. No. 4,708,356, and Ser. No. 06/867,020 filed May 27, 1986.

BACKGROUND OF THE INVENTION

The present invention relates to a hydraulic braking device, and also to a clutch particularly useful in such braking device. The invention is especially applicable to human powered vehicles (e.g. bicycles, tricycles) used for transportation or sport, such as described in the above-cited copending patent applications. The invention is therefore described below with respect to such a vehicle, but it will be appreciated that various features of the invention could advantageously be used in many other applications.

Vehicles conventionally include mechanical braking devices, such as friction disc brakes, for braking the vehicle. In fuel powered vehicles, a considerable part of the braking is effected by the vehicle engine, thereby subjecting the mechanical brakes to less wear and tear, particularly during long descents. Since human powered vehicles do not include an engine, they rely on the conventional friction brakes for braking the vehicle; this subjects the friction brakes to considerable wear and tear particularly during long vehicle descents.

An object of the present invention is to provide a hydraulic braking system for braking a driven device, which hydraulic braking system is particularly, but not exclusively, useful in human powered vehicles. Another object of the invention is to provide a clutch construction particularly, but not exclusively, useful in the hydraulic braking system of the present invention. A further object is to provide a human powered vehicle including a hydraulic braking device; and a still further object is to provide a releasable retainer device particularly useful in the clutch of the hydraulic braking device for stably retaining the two jaws of the clutch in their engaged and disengaged positions.

BRIEF SUMMARY OF THE INVENTION

According to one feature of the present invention, there is provided a hydraulic braking system for braking a driven device, comprising: a hydraulic pump; a clutch coupling the hydraulic pump to the driven device when the clutch is actuated; a hydraulic circuit for a liquid including a flow restrictor restricting the flow of the liquid therethrough; and a hydraulic connection from the pump to the hydraulic circuit such that, when the clutch is actuated to couple the pump to the driven device, the flow restrictor imposes a hydraulic load on the driven device thereby braking it.

According to another feature of the invention, there is provided a jaw clutch particularly useful in the above hydraulic braking system, the jaw clutch comprising a first jaw coupled to the driving member, a second jaw coupled to the driven device, and a clutch actuator effective, when actuated, to move one of the jaws into engagement with the other jaw to couple the hydraulic pump to the driven device, the two jaws further including friction surfaces normally spaced apart but brought together upon the actuation of the clutch actuator, before the jaws are brought into engagement with each other, to start the first jaw to rotate before its engagement with the second jaw.

According to a further feature of the invention, there is provided a human powered vehicle including a hydraulic braking device for hydraulically braking the vehicle, and a manual control member for manually actuating the hydraulic braking device.

According to a further feature of the invention, there is provided a retainer device particularly useful in the jaw clutch of the hydraulic braking system, for quickly and positively moving the two jaws together during the actuation of the clutch, and apart during the deactuation thereof.

According to a still further feature of the invention, there is provided a human powered vehicle including a vehicle frame supported on a plurality of wheels, a braking device for braking the vehicle, a manually operated lever pivotably mounted to the frame, and a handle rotatably mounted to the lever for actuating the braking device. In the described preferred embodiment, there are two manually operated levers pivotably mounted to the frame for steering the vehicle, each of the levers including a rotatably mounted handle for actuating the braking device.

Further features of the invention will be apparent from the description below.

BRIEF DESCRIPTION OF THE DRAWINGS

The invention is herein described, by way of example only, with reference to the accompanying drawings, wherein:

FIG. 1 is a schematic view illustrating a human powered vehicle including a hydraulic braking system constructed in accordance with the present invention;

FIG. 2 is a sectional view illustrating the manual control member used by the operator for actuating the hydraulic braking system;

FIG. 3 is a schematic view of the hydraulic braking system; and

FIG. 4 illustrates one implementation of the hydraulic braking system of FIG. 3.

DESCRIPTION OF A PREFERRED EMBODIMENT

The hydraulic braking system described below is embodied in a human-powered vehicle of the type described in my above-cited patent applications Ser. No. 06/809,387 filed Dec. 16, 1985, and Ser. No. 06/867,020 filed May 27, 1986. The vehicle therein described is a three-wheeled vehicle, including a pair of front wheels 2, 4, and a rear wheel 6 which is driven by foot-operated pedals and/or by manually-operated levers. The vehicle can accomodate two passengers: the rear passenger aids in the propulsion of the vehicle by operation of the foot-pedals and hand levers; while the front passenger also aids in the propulsion of the vehicle by operation of the foot pedals, and also effects the various controls of the vehicle including steering, braking, and transmission-control by control members accessible to the front passenger.

The only controls which are pertinent to the invention of the present application are the braking controls, and therefore they are described more particularly below. The remaining controls are not particularly involved in the invention of the present application, and are therefore not described herein, but reference may be made to the above-cited patent applications for full particulars of the structure and operation of the other controls.

The braking controls in the vehicle illustrated in FIG. 1 comprise a first handle 8 mounted at the upper end of the right-hand steering lever 9, and a second handle 10 mounted at the upper end of the left-hand steering lever 11. Both handles 8 and 10 are pivotably mounted about horizontal axes, and are attached to cords 12 and 14, respectively, which are pulled in one direction by the rotation of their respective handles about their pivotable axes. The structure of handle 8, and the manner it moves its cord 12, are more particularly illustrated in FIG. 2 described below.

As will also be described below, handle 8 actuates the hydraulic brake for braking the rear wheel 6; handle 10 actuates both the hydraulic brake for the rear wheel 6, and mechanical brakes, such as drum brakes, schematically indicated at 16 and 18, on the two front wheels 2 and 4 respectively.

The vehicle schematically illustrated in FIG. 1 further includes a parking-brake lever 20 which actuates only the mechanical brakes 16, 18 of the front wheels 2 and 4.

As shown in FIG. 2, handle 8, which actuates the hydraulic brake for the rear wheel 6, is integrally formed with a hub 22 rotatably mounted by a bushing 24 to the upper end of the right-hand steering lever 9. One end of cord 12 is secured to hub 22 such that when handle 8 is rotated in one direction, the cord is shortened to move its opposite end in the direction shown by the arrow head in FIG. 1. The movement of the cord is guided by a guide 26 (FIG. 2) carried by lever 9.

Handle 8 further includes a turn-indicator button 28 operating a switch 30 connected by an electrical conductor within a conduit 32 passing through handle 8 and its hub 22 to the turn-indicator circuit (not shown). Push button 28 is urged to its outer, non-actuating postion by a spring 34. The force required to depress the push-button in order to actuate the turn-indicator may be preseleted by a nut 36 threaded within a socket formed in handle 8 and against which spring 34 bears.

Handle 10, on the left-handle lever 11 for acutating the mechanical brakes 16, 18, on the front wheels 2, 4 and the hydraulic brake on the rear wheel 6, is similarly constructed as handle 8, and also includes a push-button actuator corresponding to actuator 28 for actuating the other turn-indicator.

Cord 14 actuated by brake handle 10 is coupled to cord 12 actuated by brake handle 8 such that when handle 10 is rotated to actuate the mechanical brake 16, 18 of the front wheels 2, 4, it also actuates the hydraulic brake coupled to cord 12. In addition, the parking brake lever 20 is coupled by means of a cord 38 to the mechanical braking system such that when lever 20 is actuated, only the mechanical brakes 16, 18 on the front wheels 2, 4, are actuated; that is, the hydrualic brake acting on the rear wheel 6 is not actuated by the parking brake lever 20.

For the foregoing purposes, the hydraulic-brake cord 12 is connected to a control member 40 which cooperates with a control member 42 connected by a cord 43 to another control member 44, which later control member is connected to cord 14 actuated by brake handle 10. In addition, cord 38, actuated by the parking brake lever 20, is connected to a control member 46 cooperable with a rotatable member 48 pivotably mounted by a leg 48a and having a pair of parallel arms 48b, 48c, cooperable with legs 46a, 44a, on control members 46 and 44. In addition, control members 40 and 42 each include legs 40a, 42a cooperable with each other to transmit the motion of one member to the other. Further leg 48b of control member 48 is coupled by cord 49a for actuating the drum brake 16 on front wheel 2, and by cord 49b for actuating drum brake 18 on front wheel 4.

The above-described arrangement, schematically illustrated in FIG. 1, produces the following operations: pivoting handle 8 moves cord 12 in the direction of the arrow head to actuate the hydraulic brake acting on the rear wheel 6; pivoting handle 10 moves cord 14 and control member 44 to pivot control member 48 so that it moves cords 49a, 49b to actuate the drum brakes 16, 18 on the front wheels 2, 4, while leg 48c moves cord 43, and control members 42, 40 to actuate the hydraulic brake acting on the rear wheel 6; and pivoting parking brake 20 moves cord 38 and its control member 46 in the direction of the arrows to pivot control member 48 so that its leg 48b actuates only the drum brakes 16, 18 on the front wheels 2, 4.

The hydraulic brake, acting on rear wheel 6, includes a jaw clutch, generally designated 50, and two hydraulic units 51, 52 interconnected by two tubes 53, 54. Hydraulic unit 51 includes a pump 55 (FIG. 3) driven by the rear wheel 6 via a shaft 56 when jaw clutch 50 is engaged; and hydraulic unit 52 includes a variable orifice 58, acting as a flow restrictor, through which the hydraulic liquid driven by pump 55 passes in order to impose a hydraulic load on wheel 6, when clutch 50 is engaged.

The above-described hydraulic circuit including the two hydraulic units 51 and 52 is more particularly illustrated in FIG. 3, wherein it will be seen that the hydraulic circuit includes a closed loop between pump 55 and variable orifice 58 via tubes 53 and 54. As shown in FIG. 3, this closed loop further includes a one-way valve 59 and an oil filter 60 both disposed within hydraulic unit 51 containing the pump 55. It will also be seen, from FIG. 3, that the hydraulic circuit further includes a bypass line, bypassing the variable orifice 58 and including an accumulator 62 to accomodate changes in the oil volume because of temperature variations, and a release valve 64 to prevent an excess build up of pressure in the hydraulic circuit. Both accumulator 62 and release valve 64 are in hydraulic unit 51 containing the pump 55.

Both the jaw clutch 50 and the variable orifice 58 are controlled by control member 40 coupled to handle 8 via cord 12. For this purpose, control member 40 includes another cord 12a (FIG. 1) entering hydraulic unit 52 containing the variable orifice 58.

As shown in FIG. 4, cord 12a is connected, within hydraulic unit 52, to a cam plate 66 movable against the action of a spring 67 between a pair of limit positions defined by limit members 68 and 69. Thus, limit 68 fixed to the vehicle chassis defines the home position of cam plate 66, and limit 69 carried by cam plate 66 defines the maximum actuated position of the cam plate.

Cam plate 66 includes two cam surfaces 66a, 66b. Cam surface 66a, which is relatively short and sharply inclined, controls the jaw clutch 50; and cam surface 66b which is relatively long and less inclined, controls the size of the variable orifice 58.

With respect to cam surface 66b, it will be seen that it cooperates with a cam follower 70 carried at the end of a stem 71 movable against the action of a spring 72.

Stem 71 is formed with a passageway defining the orifice 58 in the closed-loop hydraulic circuit illustrated in FIG. 3. Stem 71 is movable within a bore 73a formed in a block 73, which block is formed with two further bores 73b, 73c in alignment with each other and separated by bore 73a receiving stem 71. Bore 73b is connected to tube 53 at one side of the orifice 58, and bore 73c is connected to tube 54 at the opposite side. In the illustrated position of cam plate 66, cam follower stem 70 is located such that its orifice 58 is exactly aligned with the two bores 73b, 73c, so as to define an orifice 58 of maximum cross-section; whereas when stem 71 is displaced downwardly by the engagement of its cam follower 70 with cam surface 66b, the size of orifice 58 is decreased in accordance with the amount of displacement of stem 71 by cam surface 66b.

As described earlier, and as will be described more particularly below, orifice 58 acts as a variable flow restrictor to the oil flowing through the closed loop from pump 55, driven by the rear vehicle wheel 6 when jaw clutch 50 is actuated, to impose a hydraulic load on the rear wheel and thereby to hydraulically brake it.

Cam surface 66a, also carried by cam plate 66 displaced by handle 8 via cord 12a, actuates the jaw clutch 50 via another cord 12b connected at one end to a cam follower 74 via links 75, 76 disposed within hydraulic unit 52. The opposite end of 12b is connected to an actuator 78 of the jaw clutch 50. Actuator 78 is pivotably mounted about a pivot 79 from the illustrated home position wherein it is releasably retained by a retainer member 80, to an actuated position for actuating the jaw clutch.

Jaw clutch 50 includes a pair of jaws 81, 82, normally retained apart, but movable into engagement when actuator 78 is pivoted (clockwise, FIG. 4) by cord 12b. Jaw 81 is rotatably mounted by a one-way clutch 84 to shaft 85 of pump 55; and jaw 82 is coupled by a spline 86 to shaft 56. Shaft 56 is in turn coupled by a transmission, schematically indicated at 83 in FIG. 1, to rear vehicle wheel 6. Spline 86 permits its jaw 82 to move axially with respect to its shaft 56, such that the rotational movements of shaft 56 are transmitted to pump 55 via spline 86, jaw 82, jaw 81, one-way clutch 84 and shaft 85.

Jaw 81 includes a stem 87 carrying a disc 88 rotatably mounted with respect to stem 87. A spring 89 is interposed between jaw 81 and disc 88, so as to transfer rotary motion of the disc to the jaw. Disc 88 is formed with a conical surface 88' aligned with, but normally spaced from, a conical surface 90 on a stem 91 formed in jaw 82. Conical surface 90 has a friction facing engageable with conical surface 88' in the initial movement of jaw 82, when clutch 50 is actuated by actuator 78, so as to start the rotation of jaw 81 before it comes into engagement with rotating jaw 82.

Jaw 82 includes an annular recess 82a receiving end 78a of actuator 78. The dimensions of recess 82a are slightly larger than those of actuator end 78a such that the actuator end may be retained within the recess without contacting its sides.

Jaw 82 is releasably retained in its clutch-disengaged position (illustrated in FIG. 4) or its clutch-engaged position by an over-center bistable device comprising two ball bearings 93, 94. Ball bearing 93 is received within a reces 93a formed in shaft 56 coupled to the vehicle wheel 6, and is urged by a spring 93b to project slightly out of that recess. Ball bearing 94 is similarly received within a recess 94a formed in clutch jaw 82 and is urged by a spring 94b to project slightly out of that recess. The two balls are retained in their projecting positions by conventional retainer elements (not shown).

The arrangement is such that in one position of clutch jaw 82, ball bearing 94 bears against one side of ball bearing 93 to stably retain jaw 82 in the non-actuated position of jaw 82 wherein its end face limits against annular stop 95 carried by shaft 56. In this position, actuator end 78a is received within recess 82a but is slightly spaced from the sides of the recess. When clutch actuator 78 is actuated, it moves jaw 82 towards jaw 81. Initially, ball bearing 94 presses against ball bearing 93 to impose a restraining force against the movement of jaw 82, storing energy in their respective springs 93b, 94b, until ball bearing 94 passes the center of ball bearing 93. At that time, the energy stored in the respective springs applies a snap-action movement to jaw 82 to move it to its other stable position engaging jaw 81 after first starting that jaw to rotate via spring 89, by the engagement of conical surfaces 88' and 90. In this other stable position of jaw 82, actuator end 78a is not spaced from the sides of recess 82a.

One-way clutch 84 disconnects pump 55 from the rear wheel 6 when the vehicle is travelling backwards, even should jaw cluch 50 be engaged. This feature prevents excess oil pressure from developing inside pump 55, which may occur since one-way valve 59 is then closed.

One-way valve 59 functions mainly to prevent dirt accumulated in the oil filter 60 from being drawn back into the closed loop.

Generally, all the cables illustrated in the drawings (e.g. cable 12, 12a, 14, etc.) are enclosed within flexible sleeves.

The braking system illustrated in the drawings operates as follows:

Should the operator wish to apply only the hydraulic brake, for example during a long descent, the operator would rotate handle 8 to wind cord 12 on its hub and thereby to move control member 40 (FIG. 1) in the direction of the arrow. Cord 12a, which enters hydraulic unit 52, would thereby move cam plate 66 (rightwardly, FIG. 4) so as first to bring cam surface 66a into engagement with cam follower 74, and then to bring cam surface 66b into engagement with cam follower 70.

Cam surface 66a actuates the jaw clutch 50 via linkages 75, 76 and actuator 78, to move jaw 82 towards jaw 81. The initial movement of jaw 82 causes friction surfaces 90, 88 to engage each other, and thereby, via disc 88 and spring 89, to start jaw 81 to rotate before actually engaging jaw 82. The movement of jaw 82 is effected by a snap-action, by virtue of the bistable retainer arrangement including the two spring-biased ball bearings 93 and 94 as described above.

The engagement of jaw 82 with jaw 81 effects a coupling between the vehicle rear wheel 6 via its shaft 56, and the pump 55 via its shaft 85. The pump is thus driven by the vehicle wheel to drive the oil through the closed loop circuit including orifice 58 and the two tubes 53, 54, whereby the orifice exerts a hydraulic load on the rear wheel 6, tending to brake it.

This hydraulic load is varied by the amount of rotation of handle 8, which, via cord 12a, varies the amount of displacement of the cam plate 66. Thus, cam follower 70 cooperates with cam surface 66b of cam plate 66 such that, the greater the displacement of the cam plate, the greater will be the displacement of stem 71 within block 73, and thereby the greater will be the misalignment of orifice 58 with respect to bores 73b, 73c in block 73. Thus, the operator may control the magnitude of the hydraulic braking force applied to the rear wheel 6 by rotating handle 8 to a greater extent, which will thereby, via cam surface 66b of cam plate 66 and stem 71, increase the misalignment of orifice 58 with respect to bore 73b, 73c, and thereby decrease the cross-sectional area of that orifice.

When the hydraulic braking is to be terminated, the operator moves back, or releases, handle 8, whereupon spring 67 will restore cam plate 66 to its initial home position, reopening orifice 58 and declutching the jaw clutch 50.

To apply the normal vehicle brakes, the operator rotates handle 10, which thereby actuates the drum brakes 16, 18 on the two front wheels 2, 4 via cord 14, control member 44, and leg 48c of control member 48. Rotation of handle 10 also actuates the above-described hydraulic brake acting on the rear wheel 6 via control members 44, 42, and 40. Operation of the parking brake lever 20, however, actuates only the drum brakes 16, 18 on the front wheels 2, 4, this being done via control member 46 and leg 48b of control member 48.

It will thus be seen that, during the normal operation of the vehicle, jaw clutch 50 is disengaged, so that no load is applied to the drive. Thus, pump 55 disconnected from the drive during the normal operation of the vehicle, the pump being connected to the drive to brake the vehicle only when jaw clutch 50 is actuated.

Rotary handles 8, 10 rotatably mounted on the top of the steering levers 9, 11 enable the occupant to steer the vehicle and also to apply the brakes whenever required. This reduces the reaction time required in order to actuate the brakes, and also divides the force required for braking the vehicle between the two hands of the operator. This arrangement further enables the vehicle to be braked by operating either handle 8 or handle 10, should there be a failure in one of the two braking systems.

While the invention has been described with respect to one embodiment, it will be appreciated that this embodiment is described purely for purposes of example, and that many other variations, modifications and applications of the invention may be made.

What is claimed is:

1. A hydraulic braking system for braking a driven device, comprising:
   a hydraulic pump;
   a clutch coupling said hydraulic pump to the driven device when the clutch is acutated;
   a hydraulic circuit for a liquid including a flow restricor restricing the flow of the liquid therethrough;
   a hydraulic connection from said pump to said hydraulic circuit such that, when said clutch is actuated to couple the pump to the driven device, the flow restrictor imposes a hydraulic load on the driven device thereby braking it; and a control device including a control member manually movable by the operator, and a cam member coupled to said control member for movement therewith;
   said cam member including a first cam surface coupled to said clutch and effective, upon the initial movement of said control member, to actuate said clutch to couple the hydraulic pump to the driven device, and a second cam surface, coupled to said flow restrictor, effective upon further movement of said control member, to vary the flow restrictor and thereby the hydraulic load imposed by it according to the magnitude of movement of the control member by the operator.

2. The system according to claim 1, wherein said flow restrictor includes an orifice whose cross-sectional area is varied by said second cam surface to vary the hydraulic load imposed thereby.

3. The system according to claim 1, wherein said hydraulic circuit further includes a bypass circuit bypassing said closed loop and having an accumulator to accomodate the liquid during temperature variations.

4. The system according to claim 1, wherein said clutch is a jaw clutch normally-disengaged to decouple the hydraulic pump from the driven device, but actuatable to couple the hydraulic pump to the driven device.

5. The system according to claim 4, wherein said jaw clutch includes a first jaw coupled to the hydraulic pump, a second jaw coupled to the driven device, and a clutch actuator effective, when actuated, to move one of said jaws into engagement with the other jaw to couple the hydraulic pump to the driven device, said two jaws further including friction surfaces normally spaced apart but brought together upon the actuation of said clutch actuator, before the jaws are brought into engagement with each other, to start the first jaw to rotate before it moved into engagement with the second jaw, one of said friction surfaces being carried by one jaw, and the other of said friction surfaces being carried by a disc urged towards the other jaw by a coiled spring.

6. The system according to claim 5, wherein the movable jaw is splined to a shaft for axial movement but not for rotary movement with respect to the shaft, and is releasably retained on the shaft in its engaged or disengaged position with respect to the other jaw by an over-center bistable device comprising a recess in the shaft having a bearing with a curved outer surface urged by a spring to project partly out of its recess, and a recess in said jaw having a bearing with a curved outer surface urged by a spring to project partly out of its recess, one of the bearings engaging the other bearing on one side thereof in one axial position of the movable jaw and engaging the other bearing on the other side thereof in the other axial position of the movable jaw.

7. The system according to claim 5, wherein said bearings are ball bearings.

8. A human powered vehicle including a hydraulic braking device for hydraulically braking a wheel of the vehicle, and a manual control member for manually actuating said hydraulic braking device; said hydraulic braking device comprising:
   a hydraulic pump;
   a clutch coupling said hydraulic pump to the driven device when the clutch is acutated;
   a hydraulic circuit for a liquid including a flow restrictor restricting the flow of the liquid therethrough;
   a hydraulic connection from said pump to said hydraulic circuit such that, when said clutch is actuated to couple the pump to the driven device, the flow restrictor imposes a hydraulic load on the driven device thereby braking it;
   and a control device including a control member manually movable by the operator, and a cam member coupled to said control member for movement therewith;

said cam member including a first cam surface coupled to said clutch and effective, upon the initial movement of said control member, to actuate said clutch to couple the hydraulic pump to the driven device, and a second cam surface, coupled to said flow restrictor, effective upon further movement of said control member, to vary the flow restrictor and thereby the hydraulic load imposed by it according to the magnitude of movement of the control member by the operator.

9. The vehicle according to claim 8, wherein the vehicle includes a pivotably mounted steering lever, said manual control member for manually actuating said braking device comprising a handle rotatably mounted on said steering lever.

10. The vehicle according to claim 8, wherein said control member comprises a rotatably mounted handle for actuating said braking device.

11. The vehicle according to claim 10, wherein there are two rotatably mounted handles for actuating said braking device.

12. The vehicle according to claim 11, wherein each of said handles is pivotably mounted to a steering lever.

13. The vehicle according to claim 8, further including a mechanical braking device for mechanically braking the vehicle, and a second manually movable control member for actuating said mechanical braking device, said second control member being coupled to said hydraulic braking device to actuate same when it actuates said mechanical braking device.

14. A hydraulic braking system for braking a human powered vehicle, comprising:
a hydraulic pump;
a clutch coupling said hydralic pump to the vehicle wheels when the clutch is actuated;
a hydraulic circuit for a liquid including a flow restrictor restricting the flow of the liquid therethrough;
and a hydraulic connection from said pump to said hydraulic circuit such that, when said clutch is actuated to couple the pump to the vehicle wheels, the flow restrictor imposes a hydraulic load on the vehicle wheels thereby braking it;
said clutch including a first jaw coupled to the hydraulic pump, a second jaw coupled to the vehicle wheels, and a clutch actuator effective, when actuated, to move one of said jaws into engagement with the other jaw to couple the hydraulic pump to the vehicle wheels, said two jaws further including friction surfaces normally spaced apart but brought together upon the actuation of said clutch actuator, before the jaws are brought into engagement with each other, to start the first jaw to rotate before it moves into engagement with the second jaw, one of said friction surfaces being carried by one jaw and the other of said friction surfaces being carried by a disc urged towards the other jaw by a coiled spring.

15. The hydraulic braking system according to claim 14, wherein said control device includes a control member manually movable by the operator, and a cam member coupled to said control member for movement therewith, said cam member including a first cam surface effective to actuate said clutch to couple the hydraulic pump to the driven device, and a second cam surface effective to vary the flow restrictor and thereby the hydraulic load imposed by it according to the magnitude of movement of the control member by the operator.

* * * * *